US008627355B2

(12) United States Patent
Lanfermann et al.

(10) Patent No.: US 8,627,355 B2
(45) Date of Patent: Jan. 7, 2014

(54) SYSTEM AND METHOD FOR DISPLAYING SELECTED INFORMATION TO A PERSON UNDERTAKING EXERCISES

(75) Inventors: Gerd Lanfermann, Aachen (DE); Klaus Weidenhaupt, Wassenberg (DE); Richard Daniel Willmann, Siegburg (DE)

(73) Assignee: Koninklijke Philips N.V., Eindhoven (NL)

( * ) Notice: Subject to any disclaimer, the term of this patent is extended or adjusted under 35 U.S.C. 154(b) by 239 days.

(21) Appl. No.: 12/673,791

(22) PCT Filed: Aug. 20, 2008

(86) PCT No.: PCT/IB2008/053328

§ 371 (c)(1),
(2), (4) Date: Nov. 18, 2010

(87) PCT Pub. No.: WO2009/024929

PCT Pub. Date: Feb. 26, 2009

(65) Prior Publication Data

US 2011/0072457 A1 Mar. 24, 2011

(30) Foreign Application Priority Data

Aug. 22, 2007 (EP) .................................... 07114730

(51) Int. Cl.
*H04N 7/10* (2006.01)

(52) U.S. Cl.
USPC ................................. 725/34; 725/10; 725/42

(58) Field of Classification Search
USPC ................................ 725/34, 10, 42; 705/2, 3
See application file for complete search history.

(56) References Cited

U.S. PATENT DOCUMENTS

| | | | | |
|---|---|---|---|---|
| 6,663,491 | B2 * | 12/2003 | Watabe et al. | 463/36 |
| 6,778,866 | B1 * | 8/2004 | Bettwy | 700/56 |
| 6,904,408 | B1 | 6/2005 | McCarthy et al. | |
| 6,978,244 | B2 * | 12/2005 | Rovinelli et al. | 705/2 |
| 2001/0051559 | A1 | 12/2001 | Cohen et al. | |
| 2003/0005067 | A1 | 1/2003 | Martin et al. | |
| 2003/0208588 | A1 | 11/2003 | Segal | |
| 2006/0277075 | A1 | 12/2006 | Salwan | |
| 2007/0088603 | A1 | 4/2007 | Jouppi et al. | |
| 2008/0161733 | A1 * | 7/2008 | Einav et al. | 601/34 |
| 2008/0162352 | A1 * | 7/2008 | Gizewski | 705/50 |

FOREIGN PATENT DOCUMENTS

| | | | |
|---|---|---|---|
| WO | 0219237 | A1 | 3/2002 |
| WO | 2004012031 | A2 | 2/2004 |
| WO | 2004051415 | A2 | 6/2004 |
| WO | 2005089481 | A2 | 9/2005 |
| WO | 2006060626 | A2 | 6/2006 |

* cited by examiner

*Primary Examiner* — Jivka Rabovianski

(57) ABSTRACT

A system for displaying selected information to a person undertaking exercises includes a physical data assessment unit, a physical data gathering unit, and a motion template database. The physical data gathering unit and the motion template database are in communication with the physical data assessment unit. The system further includes an impairment profile generator, an information database including audiovisual information to be displayed to the person according to the impairment profile, and an audiovisual display unit. The information database and the audiovisual display unit are in communication with the impairment profile generator and the impairment profile generator is in communication with the physical data assessment unit. Information such as advertisements is displayed on display to the person where advertisement selection rules are based on Bayesian inference.

15 Claims, 4 Drawing Sheets

SYSTEM AND METHOD FOR DISPLAYING SELECTED INFORMATION TO A PERSON UNDERTAKING EXERCISES

BACKGROUND OF THE INVENTION

The present invention concerns a system and a method for displaying selected information to a person undertaking exercises.

Personalized advertisement for television, radio or the internet is a key area of revenue for many content delivery businesses. The quality of personalized content is essential and a multitude of systems for generating personalized content are known.

There is a very special situation in the life of a consumer: while he is a patient. In this situation the patient is often confronted with the necessity of adapting a different lifestyle or of making use of rehabilitation aids such canes, wheel chairs and the like. In such a circumstance the patient is likely to welcome personalized and targeted advertisements, since this content is addressing a real need for information.

The condition of the patient may change over time. That means that the advertisement content must change as the condition improves or deteriorates. Otherwise the advertisement is no longer perceived to be personal.

Personalized advertisements are often based on a profile of a user. An example is given in US 2007/00088603 A1, dealing with a method for targeted data delivery, said method comprising accessing a user profile associated with said user, wherein said user profile is used to target delivery of data to said user based on said user profile without requiring a release of any information in said user profile and weighting selected items in said user profile to determine a first score for said user profile, wherein said user is eligible to be presented with a first offer of data provided said first score satisfies a first threshold.

However, the actual development of the user's condition over time is not used to generate a personalized advertisement content.

SUMMARY OF THE INVENTION

It will be apparent from the above that a need still exists in the art for generating personalized information directed to a patient which more closely addresses the patient's situation and which adapts to the changing condition of the patient. It is therefore an object of the invention to provide a system capable of this.

To achieve this and other objects, the present invention is directed to a system for displaying selected information to a person undertaking exercises comprising:

an physical data assessment unit;

a physical data gathering unit;

a motion template database;

the physical data gathering unit and the motion template database being in communication with the physical data assessment unit; the system further comprising:

an impairment profile generator;

an information database comprising audiovisual information to be displayed to the person according to the impairment profile;

an audiovisual display unit;

the information database and the audiovisual display unit being in communication with the impairment profile generator and the impairment profile generator being in communication with the physical data assessment unit.

DETAILED DESCRIPTION OF THE INVENTION

Before the invention is described in detail, it is to be understood that this invention is not limited to the particular component parts of the devices described or process steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

Displaying selected information according to the present information is to be understood as conveying audiovisual information to a person. The information is selected for being interesting, useful or beneficial to the person. Information can mean audio files, video files or combined audio video files. A person undertaking exercises can be a patient in rehabilitation after suffering from a stroke or the like. The exercises are then those prescribed by a therapist to perform with or without supervision.

The person is monitored by a physical data gathering unit. This can be undertaken either only while the person is conducting rehabilitation exercises or continuously. The physical data gathering unit translates signals from, for example, sensors on the person's body, into representations of the person's physical state, for example the person's posture, movement, cardiovascular fitness, and the like. The exercise to be conducted can be displayed on an exercise display unit such as a television or computer screen. The individual exercise is stored in a motion template database. The exercise display unit can display the required exercise in the form of an avatar. Additionally, a representation of the person's posture can also be displayed there in order to provide visual feedback whether the person is exercising correctly or not.

With respect to the connection of the individual units, the physical data gathering unit and the physical data template database are in communication with the physical data assessment unit. When an exercise display unit is present, it is also in communication with the exercise assessment unit. The communication can either be achieved via integration of components into one system, via a wired connection, wirelessly or in a body area network using the electrical conductivity of the human body.

A physical data assessment unit is used to compare the physical data from the person to the motion template of the exercise the person should be doing. The deviations are recorded.

The system according to the present invention further comprises an impairment profile generator. This unit calculates a personalized impairment profile of the person undertaking the exercises. The profile can be based upon motor assessments, such as the deviation of the performed exercises from a given motion template. It can also take into account the cardiovascular fitness, as obtainable from blood pressure and pulse readings or results of a continuous monitoring of the person, such as how fast or to which extent a person can generally move a limb. The impairment profile may also be based on how well the person keeps his balance. Further input for the profile may come from cognitive performance results, for example when the person has undertaken memory, speech exercises or questionnaires about the amount of pain the person is perceiving.

An information database comprising audiovisual information to be displayed to the person is also part of the system according to the invention. According to the impairment profile, audiovisual information is selected. The information can be in the form of audio clips, video clips or audiovisual clips. The information can relate to the person in the form of specialized advertisements. Selection rules can be deterministic rules such as selecting advertisements for a certain product if a mobility score is in a certain numerical range and for another product if a mobility score is in a different numerical range.

A more advanced embodiment can have selection rules based on a probabilistic model of the usefulness of products for certain impairments. An example for such a model is a Bayesian network. In general, Bayesian networks are probabilistic graphical models that represent a set of variables and their probabilistic dependencies. Formally, Bayesian networks are directed acyclic graphs whose nodes represent variables, and whose arcs encode conditional dependencies between the variables.

Within a Bayesian network, if there is an arc from a first node A to a second node B, A is called a parent of B and B is a child of A. The set of parent nodes of a node $X_i$ is denoted by parents($X_i$). The arcs from the child nodes to the parent nodes represent weak causal relationships and are modeled as local conditional probability distributions. If node $X_i$ has no parents, its local probability distribution is said to be unconditional; otherwise it is conditional.

From the structure of a Bayesian network and the local probability tables attached to each node, any probability of the variables being in a certain combination of states can efficiently be calculated using the following formula, which is based on Bayes' theorem:

$$P(\underline{X})=P(X_1=x_1, X_2=x_2, \ldots, X_n=x_n; \forall x_1 \ldots x_n)=\Pi_{i=1 \ldots n} P(X_i \mid \text{parents}(X_i))$$

This formula forms the basis for the computational method called Bayesian inference or belief updating. It can be employed whenever observation nodes in a Bayesian network are instantiated.

In a network according to the invention, information to be displayed and impairment characteristics are modelled as so-called target and observation nodes which are connected to each other via conditional probability tables. Using Bayesian inference the a-posteriori probability of certain information being useful for a current instantiation of observation nodes (in other words, the impairment profile) will be calculated. All the information with a usefulness probability higher than a certain threshold, for example higher than 80%, 85%, 90% or 95%, can then be selected for the personalized advertisement content. Whenever the impairment profile changes, the usefulness probabilities will be recalculated and the advertising content modified accordingly. For this computation, several exact as well as approximate algorithms are known, for example variable elimination, clique tree propagation, recursive conditioning and stochastic MCMC simulation. The audiovisual display unit is used to show or play back the content to the person.

With respect to the interaction of these units, the information database and the audiovisual display unit are in communication with the impairment profile generator and the impairment profile generator is in communication with the physical data assessment unit. Therefore, the input from the physical data assessment unit serves to calculate an impairment profile.

As already mentioned, the updating of the impairment profile according to the present invention and the selection of appropriate information allows the adaption of the information presented to the patient in changing conditions. For example, a patient may first need a wheelchair. After he gets better, a wheelchair advertisement would not be considered personalized any more and instead an advertisement for a walking stick would be presented to him.

Within the scope of the present invention it is possible that the system further comprises an additional database comprising the person's data selected from the group comprising the medical history of the person, the medical state of the person and/or the viewing history of the audiovisual display unit. This database is in connection with the impairment profile generator so that a more detailed impairment profile can be calculated. The medical history and the medical state may comprise data relating to electromyograms (EMG), dietary needs, medication used, pulse rate, blood pressure, blood oxygen content, blood sugar content, severity of perspiration, respiratory rate and/or perceived severity of pain. For example, it is then easier to express how exhausted a person is after performing exercises.

In a preferred embodiment of the present invention the physical data assessment unit (1) is an exercise assessment unit and the physical data gathering unit (2) is a posture assessment unit. With this, the system according to the invention focuses on physical exercises of the person as they are most beneficial during rehabilitation.

In a further preferred embodiment of the present invention the system further comprises—at least one motion sensor on the person undertaking exercises, the sensor being selected from the group comprising acceleration sensors, inertia sensors and/or gravity sensors; wherein the at least one motion sensor transmits its signals to the physical data gathering unit; and the physical data gathering unit calculates a representation of the person's posture based on the signals of the at least one motion sensor.

The motion sensors can be worn on the body of the person on selected locations like upper arm, lower arm, upper leg, lower leg or torso. They can be commercially available highly integrated solid state sensors. The transmission of the sensor signals to the posture assessment unit can be undertaken via wire, wirelessly or in a body area network using the electrical conductivity of the human skin. After calculation of the posture the result can be displayed in the form of an avatar on the exercise display.

In a further preferred embodiment of the present invention the physical data gathering unit comprises at least one optical mark on the person undertaking exercises, the physical data gathering unit comprises an optical tracking system for tracking the at least one optical mark and the physical data gathering unit calculates a representation of the person's posture based on the signals of the optical tracking system. The optical marks can be borne on the body of the person on selected locations like upper arm, lower arm, upper leg, lower leg or torso. The tracking of the marks can be effected with a single camera or a multitude of cameras. When a stereo camera is used, three-dimensional posture and movement data is generated. After image processing and calculation of the person's posture the result can be displayed in the form of an avatar on the exercise screen.

It is also possible to combine several posture monitoring principles. For example, a combination of motion sensors and optical tracking may provide complementary data to better calculate the posture of the person.

The present invention is also directed to a method for displaying selected information to a person undertaking exercises, comprising the steps of:

a) gathering physical data from the person undertaking exercises;
b) calculating the deviation of the physical data from a template stored in a motion template database;
c) calculating an impairment profile of the person;
d) selecting audiovisual information stored in an audiovisual information database by applying selection rules based on the calculated impairment profile;

e) displaying the selected audiovisual information on a display unit.

The individual steps have been discussed above with reference to the system according to the present invention.

In a preferred embodiment of the method according to the present invention the physical data from the person is selected from the group comprising motion data, posture data, electromyographic data, dietary needs, medication used, pulse rate, blood pressure, blood oxygen content, blood sugar content, severity of perspiration, respiratory rate and/or perceived severity of pain and the physical data is used to calculate the impairment profile. This has already been discussed with reference to the system according to the present invention.

In a further preferred embodiment of the method according to the present invention a graphical representation of the person's posture and an exercise according to a motion template are displayed on an exercise display unit. This has already been discussed with reference to the system according to the present invention.

In a further preferred embodiment of the method according to the present invention the audiovisual information in step d) is a target node in a Bayesian network, the impairment profile comprises one or more observation nodes in a Bayesian network and the audiovisual information is selected according to its probability in the Bayesian network. This has already been discussed with reference to the system according to the present invention.

It is advantageous to perform the method according to the present invention using a system according to the present invention.

The present invention is furthermore directed to the use of a system according to the present invention for displaying selected information to a person undertaking exercises.

To provide a comprehensive disclosure without unduly lengthening the specification, the applicant hereby incorporates by reference each of the patents and patent applications referenced above.

BRIEF DESCRIPTION OF THE DRAWINGS

The present invention will become more readily understood with reference to the following drawing, wherein.

DETAILED DESCRIPTION OF THE DRAWINGS

Figure 1:
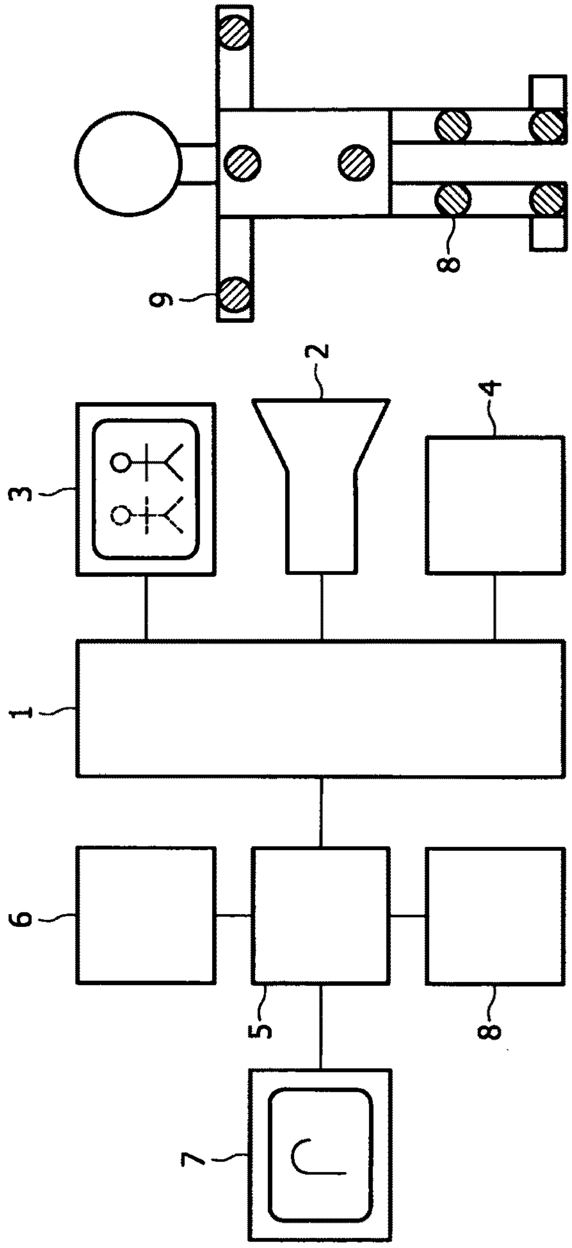
FIG. 1 shows a system according to the present invention

FIG. 1 shows a system according to the present invention for displaying selected information to a person. The person has motion sensors (8) situated on his thighs and his ankles Optical marks (9) are located on the wrists and the torso. The signals of the motion sensors (8) are transmitted wirelessly to the posture assessment unit (2). The posture assessment unit (2) further comprises an optical tracking system for identifying the position of the optical marks (9).

According to an exercise stored in a motion template database (4) a first avatar, represented as drawn in dashed lines, is displayed on the exercise display unit (3). The person performs the movements as indicated by the avatar. A second avatar, represented as drawn in solid lines, shows the posture of the person. By comparing this to the first avatar, the person is able to correct his movements and to perform the exercise more correctly.

The exercise assessment unit (1) receives data from the posture assessment unit (2) and the motion template database (4) and calculates how much the movements of the person deviate from the ideal movement of the motion template stored in database (4). This deviation information is passed on to the impairment profile generator (5). Using additional data such as medication used, pulse rate, blood pressure, blood oxygen content, blood sugar content, severity of perspiration and/or respiratory rate an impairment profile is calculated.

Based on selection rules, information in the form of an advertisement audiovisual clip is selected from the corresponding information database (6). This advertisement is then displayed on the audiovisual display unit (7). In this case, it is an advertisement for a walking cane.

Figure 2:
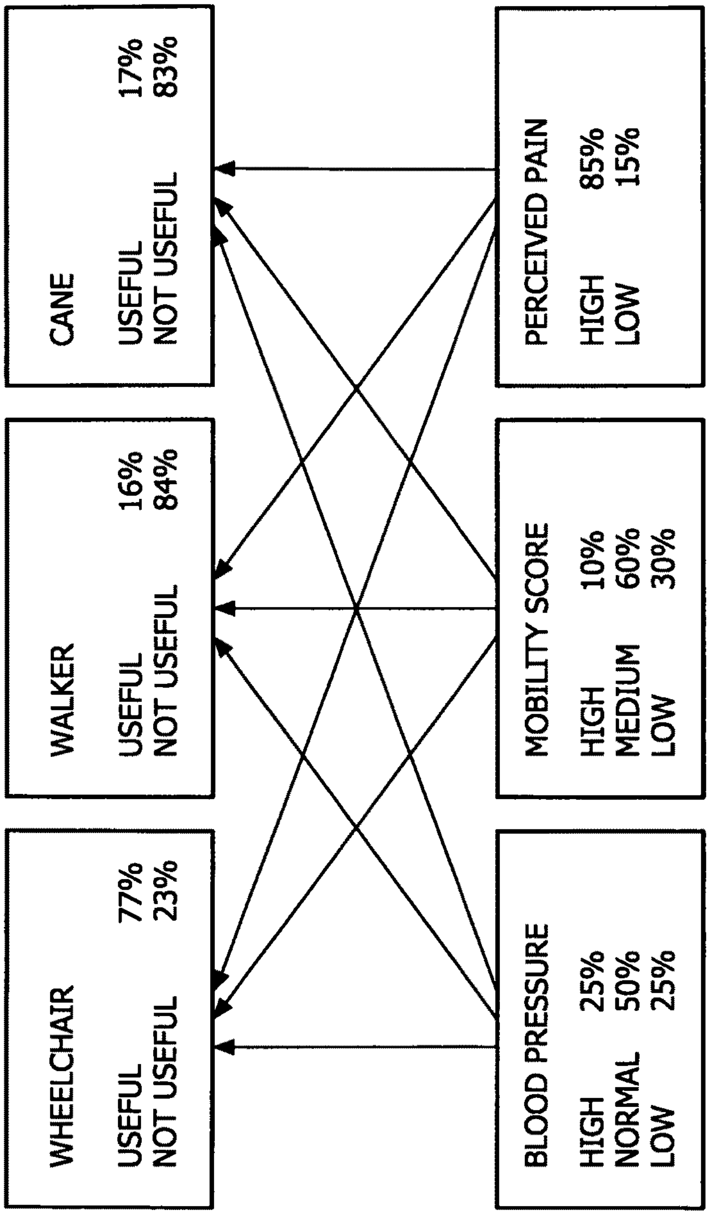
FIG. 2 shows a Bayesian network

FIG. 2 shows a Bayesian network used to model the probabilities for either a wheelchair, a walker or a cane being useful to a person given a certain impairment profile of this person. These variables are modelled as target nodes and can adopt either the state of useful or not useful. An impairment profile is defined by the three variables blood pressure, mobility score and perceived pain and their respective states. These nodes are observation nodes, meaning that their actual states can be observed. There are arcs from every observation node to every target node.

With respect to the blood pressure, it is categorized into three sections of high, normal and low blood pressure. By way of definition, a high blood pressure may be present at above 140/90 min Hg. A low blood pressure may be present at systolic pressure values of under 105 mm Hg. With respect to the mobility score, it is also categorized into high, medium and low mobility. The third variable is the perceived pain of the person in question. This information can be obtained via a questionnaire.

Each of the states of the variables in the diagram of FIG. 2 has been assigned a certain probability. In this diagram, nothing is known about the blood pressure, impairment profile and pain perception of the person. In other words, the corresponding observation nodes are uninstantiated. Therefore, a priori probabilities are assumed. As a result, the probability of the wheelchair being useful is highest with 77%, however the walker may be useful to the person with a probability of 16% and the cane may be useful with a probability of 17%.

Figure 3:
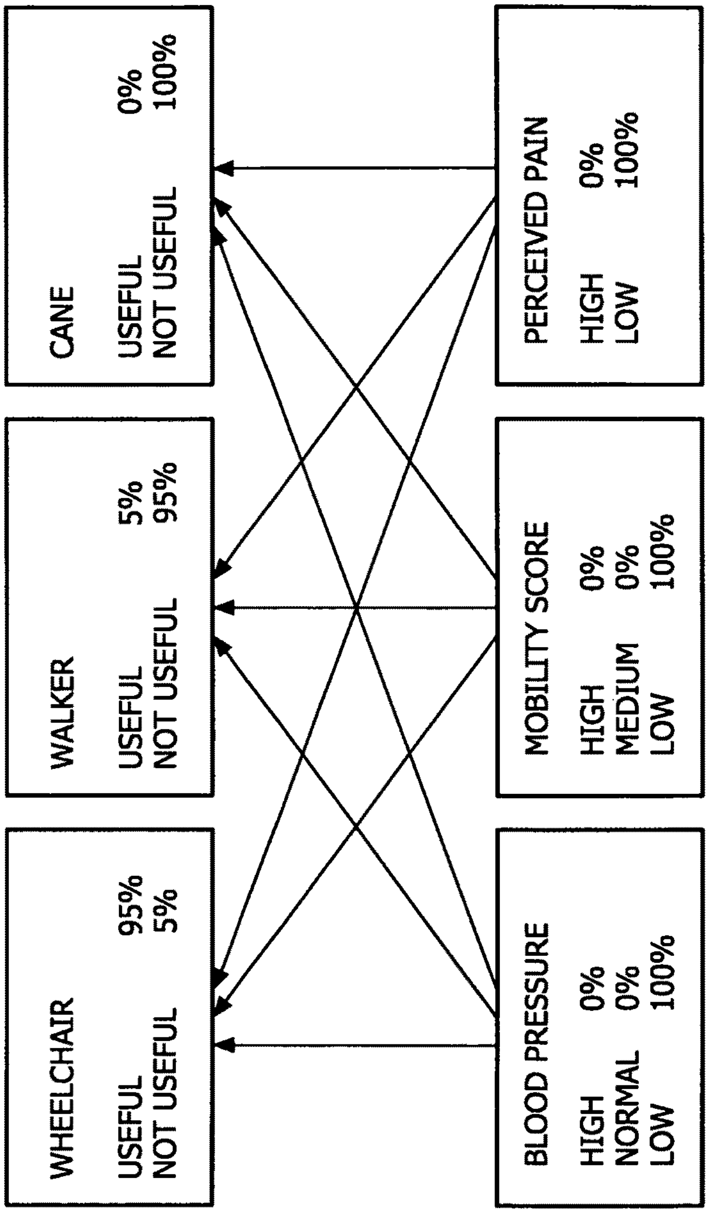
FIG. 3 shows a further Bayesian network

FIG. 3 shows the same Bayesian network as FIG. 2, the difference being that the impairment profile of the person is now known and subsequently the probabilities being recalculated. It is now known that the person has a low blood pressure. Therefore, the probability of this observation node adopting the state of low blood pressure is 100%. Furthermore, the person has a low mobility score, corresponding to the probability of this observation node adopting the state of low mobility being 100%. Finally, the person's perceived pain is low, corresponding to the probability of this observation node adopting the state of low perceived pain being 100%. As the impairment profile of the person is known, the corresponding nodes are instantiated. This means that the a priori probabilities are overridden by the observed evidence. In turn this leads to a recalculation of the probability distribution of all non-instantiated nodes in the Bayesian network. As a result of the Bayesian inference, the probability of the wheelchair being useful is 95%, of the walker being useful is 5% and the cane is being useful is 0%. Therefore, a wheelchair will be presented to the person.

Figure 4:
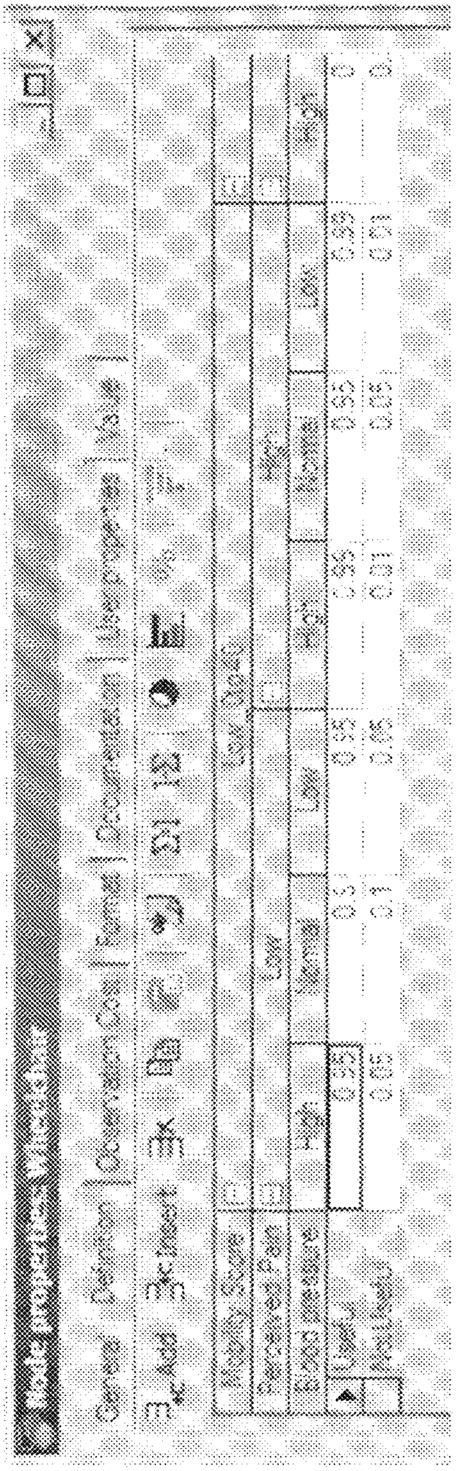
FIG. 4 shows a screenshot of part of a conditional probability table

FIG. 4 is a screenshot of a computer application modelling the Bayesian network of FIGS. 2 and 3. The situation is after recalculation of the probability distributions, therefore displaying the status as in FIG. 3. The screenshot shows part of the conditional table that defines the causal relationship between the wheelchair node and the parent nodes of the impairment profile.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A system for displaying selected information to a person undertaking exercises comprising:
- a physical data assessment unit;
- a physical data gathering unit;
- a motion template database;
- the physical data gathering unit and the motion template database being in communication with the physical data assessment unit;
- the system further comprising:
- an impairment profile generator;
- an information database comprising audiovisual information to be displayed to the person according to an impairment profile generated by the impairment profile generator;
- an audiovisual display unit;
- the information database and the audiovisual display unit being in communication with the impairment profile generator and the impairment profile generator being in communication with the physical data assessment unit,
- wherein the physical data gathering unit is configured to calculate an actual posture of the person undertaking exercises for display of a representation of the person undertaking exercises on the audiovisual display unit as a displayed representation,
- wherein the physical data assessment unit is configured to form a determined deviation by determining a deviation between a movement of the displayed representation of the person undertaking exercises displayed on the audiovisual display unit and a template representation of a reference person displayed on the audiovisual display unit undergoing a predetermined movement in accordance with the template stored in the motion template database,
- wherein the impairment profile generator is configured to update the impairment profile of the person to form an updated profile based on the determined deviation, and
- wherein the physical data assessment unit is further configured to select information from the audiovisual information to form selected information for display on the audiovisual display unit based on the updated profile.

2. The system according to claim 1, wherein the physical data assessment unit is an exercise assessment unit and the physical data gathering unit is a posture assessment unit.

3. The system according to claim 1, further comprising:
- at least one motion sensor on the person undertaking exercises, the sensor being selected from the group comprising acceleration sensors, inertia sensors and/or gravity sensors; wherein
- the at least one motion sensor transmits its signals to the physical data gathering unit; and
- the physical data gathering unit calculates the representation of the person's posture based on the signals of the at least one motion sensor.

4. The system according to claim 1, wherein
- the physical data gathering unit comprises at least one optical mark on the person undertaking exercises;
- the physical data gathering unit comprises an optical tracking system for tracking the at least one optical mark; and
- the physical data gathering unit calculates a representation of the person's posture based on the signals of the optical tracking system.

5. The system of claim 1, wherein the selected information comprises advertisement related to a physical condition of the person undertaking exercises.

6. The system of claim 1, wherein the representation is generated based on tracking of optical sensors on the person undertaking exercises.

7. The system of claim 1, wherein the representation is generated based on signals of at least one motion sensor located on the person undertaking exercises.

8. The system of claim 1, wherein the impairment profile generator updates the impairment profile of the person to include values of blood pressure, mobility and perceived pain of the person undertaking exercises detected by sensors, and wherein the values are used to calculate probabilities that the person needs a wheelchair, a walker and a cane.

9. A method for displaying selected information to a person undertaking exercises, comprising the acts of:
- displaying on a display unit a representation of the person undertaking exercises as a displayed representation and a template representation of a reference person undergoing a predetermined movement in accordance with a template stored in a motion template database;
- gathering physical data from the person undertaking exercises including a movement of the displayed representation of the person undertaking exercises displayed on the display unit;
- calculating deviation of the physical data from the template stored in the motion template database to form a calculated deviation;
- calculating an impairment profile of the person based on the calculated deviation to form a calculated impairment profile;
- selecting audiovisual information stored in an audiovisual information database to form selected audiovisual information by applying selection rules based on the calculated impairment profile;
- displaying the selected audiovisual information on the display unit.

10. The method according to claim 9, wherein the physical data from the person further comprises at least one of posture data, electromyographic data, dietary needs, medication used, pulse rate, blood pressure, blood oxygen content, blood sugar content, severity of perspiration, respiratory rate and/or perceived severity of pain and wherein the physical data is used to calculate the impairment profile.

11. The method according to claim 9, wherein the selected audiovisual information is a target node in a Bayesian network, and wherein the impairment profile comprises one or more observation nodes in a Bayesian network and the audiovisual information is selected according to its probability in the Bayesian network.

12. The method of claim 9, wherein the selected audiovisual information comprises advertisement related to a physical condition of the person undertaking exercises.

13. The method of claim 9, wherein the representation is generated based on tracking of optical sensors on the person undertaking exercises.

14. The method of claim 9, wherein the representation is generated based on signals of at least one motion sensor located on the person undertaking exercises.

15. The method of claim 9, wherein the impairment profile of the person includes values of blood pressure, mobility and perceived pain of the person undertaking exercises detected by sensors, the method further comprising the act of using the values to calculate probabilities that the person needs a wheelchair, a walker and a cane.

* * * * *